(No Model.)

J. SIRRINE.
ICE CREAM FREEZER.

No. 475,817. Patented May 31, 1892.

Witnesses
Jas. K. McCathran
W. S. Duvall

Inventor
John Sirrine
By his Attorneys,
C. A. Snow & Co.

UNITED STATES PATENT OFFICE.

JOHN SIRRINE, OF TRUMANSBURG, NEW YORK.

ICE-CREAM FREEZER.

SPECIFICATION forming part of Letters Patent No. 475,817, dated May 31, 1892.

Application filed September 7, 1891. Serial No. 404,997. (No model.)

*To all whom it may concern:*

Be it known that I, JOHN SIRRINE, a citizen of the United States, residing at Trumansburg, in the county of Tompkins and State of New York, have invented a new and useful Ice-Cream Freezer, of which the following is a specification.

The invention relates to that class of ice-cream freezers employing a revoluble freezing-cylinder and adapted to revolve in a pan of cream, whereby said cream is congealed upon the surface of the cylinder and subsequently scraped therefrom.

The objects of my invention are to provide a freezer of great simplicity, cheapness of manufacture, and ease of operation, to adapt the same to be readily cleaned, and for the simultaneous freezing of separate flavors of cream.

Other objects and advantages will appear in the following description, and the novel features thereof will be particularly pointed out in the claims.

Figure 1:
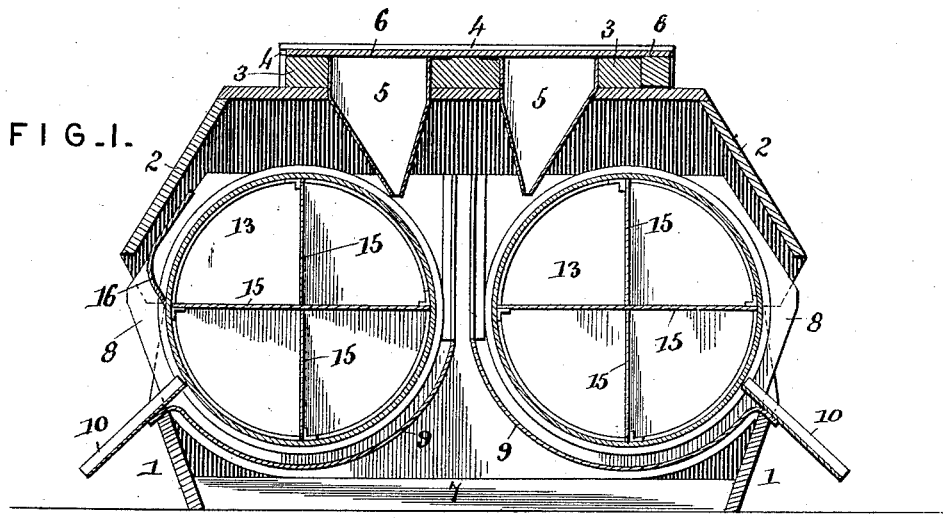
Figure 2:
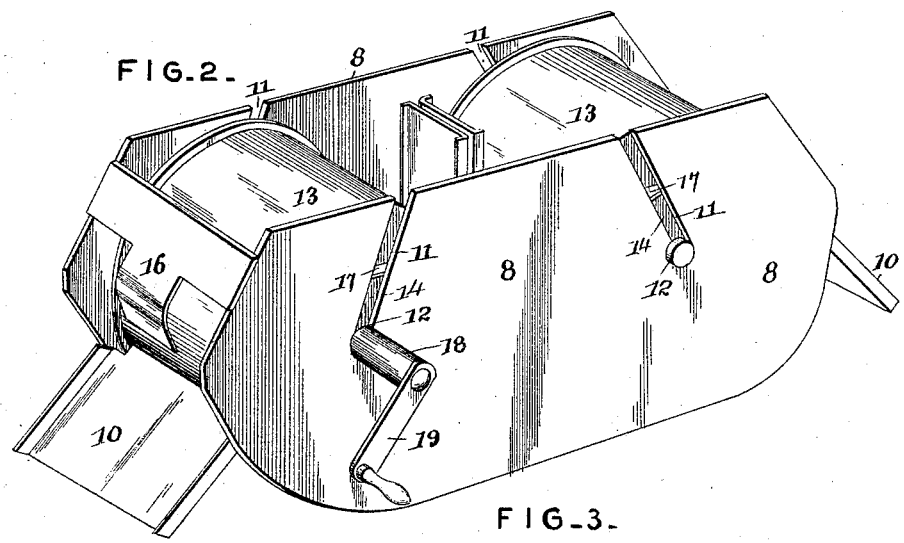
Figure 3:
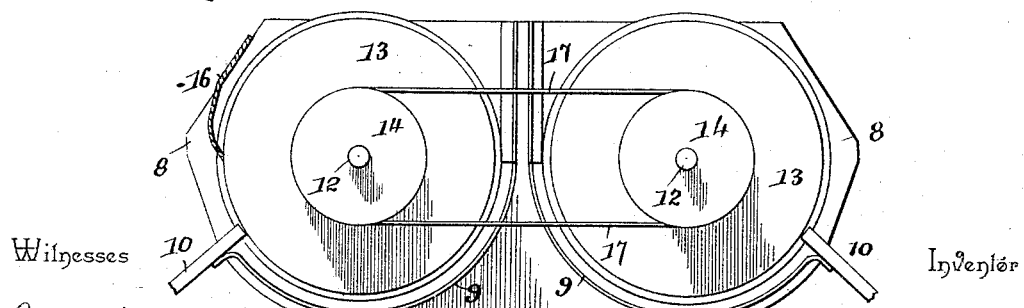

Referring to the drawings, Figure 1 is a vertical longitudinal section of an ice-cream freezer constructed in accordance with my invention. Fig. 2 is a detail in perspective of the cream-pan and cylinder-supporting case. Fig. 3 is an elevation of the same, with the side wall removed.

Like numerals of reference indicate like parts in all the figures.

The outer casing of the freezer comprises a bottom 1, oblong in plan, and a removable cover 2, secured in any suitable manner upon the bottom. The end walls of the bottom 1, as are also those of the cover, are partially cut away to form openings in the opposite ends of the external casing. A frame 3 is located upon the cover, and through openings formed in the frame and the cover depend funnels 5. The opposite sides of the frame are provided with ways 4 and receive a removable sliding cover 6, which when in position covers the funnels.

Upon bottom cleats 7, located in the bottom section 1 of the external casing, rests the internal metal case that supports the cream-pans and the cylinders. This internal case comprises opposite side walls 8, which are connected at their lower edges by a pair of curved bottoms 9, which constitute curved cream-receiving pans. The rear or inner walls of the pans extend upwardly between the side walls 8 to about flush with the upper edges thereof, while the front or outer edges of the pans occur about opposite the openings formed in the ends of the outer casing and are there provided with inclined cream-delivery blades 10, the opposite sides of which are upwardly turned to prevent the escape of cream, said pans extending outside of the outer casing.

The opposite side walls 8 at opposite sides of the centers are provided with pairs of inclined slots 11, which slots converge toward their upper ends and terminate at their lower ends in bearings. These bearings receive in a movable manner the trunnions 12, which project axially from a pair of freezing-cylinders 13. From the opposite sides of the cylinders extend pulleys 14, which are formed integral with the cylinders, one of the ends of the cylinder being movable and constituting a cover for the remainder of the cylinder. The cylinders are interiorly divided into compartments by radial partitions 15, so that the ice and salt introduced therein are prevented from falling to the bottom of the cylinder as the same is revolved and a uniform temperature of the cylinder is preserved. Above one of the cylinders a scraping-blade 16 is located, while the scraping-blade 10 below the same does not quite touch the cylinder, but simply serves as a delivery-blade. The pairs of pulleys of the two cylinders are connected by endless belts 17, so that movement of one cylinder is communicated to the other cylinder. In this manner double quantities of cream of the same flavor may be simultaneously made or two creams of different flavors may be simultaneously made. In either instance it will be understood that the soft melted cream is poured through the funnels in the outer casing and allowed to fall upon the cylinder, where it is congealed, and scraped therefrom when said cylinder has brought the same in contact with the scrapers. Any cream not thoroughly frozen will be caught by the creaming-pans, heretofore described, and the extension of said pans at their inner edges up and between the cylinders prevents the admixture of the two creams while being frozen. The trunnion of one of the cylinders is extended considerably beyond its bearing and through an opening formed in the outer casing and opposite said opening carries a loose bearing-sleeve, which fits the opening and in which the trunnion revolves. Beyond the sleeve 18 an ordinary crank-handle 19 is secured to the trunnion, and through the medium of the same the cylinders may be revolved and the operation of freezing carried on.

The operation of freezing will at once be apparent from the foregoing description, and will require no minute description. I will, however, make the following brief statement with relation thereto: The cylinders being removed from the inner casing have their heads removed and are filled with ice and salt in proper proportions, after which the belts are adjusted and the two cylinders mounted in position in their bearings. The cover of the outer casing is now replaced in position and the cream in a melted state poured into the funnels or hoppers. It now simply remains to revolve the crank and thus rotate the two cylinders, upon which the cream congeals and from which it is scraped in the manner heretofore described.

Having described my invention, what I claim is—

1. In an ice-cream freezer, the combination, with the casing, of the movable internal casing, the opposite cylinders mounted removably therein and provided with axial pulleys, endless belts connecting the pulleys, a crank for rotating one of the cylinders, and creaming-pans located under the cylinders and having their inner ends upwardly extended between the cylinders, substantially as specified.

2. In an ice-cream freezer, the combination, with a casing consisting of a bottom and a covering-section, of internal freezing-cylinders, a frame located upon the covering-section and provided with openings and opposite ways, hoppers depending through the openings at points above the cylinders, and a cover removably mounted in the ways, substantially as specified.

3. In an ice-cream freezer, the combination, with the outer casing and the inner casing removably mounted therein and comprising opposite side walls having pairs of oppositely-inclined slots terminating at their lower ends in bearings, of the pans located below the bearings, the delivery-blades extending from the front edges of the pans and one located at the upper corners of the sides of the inner casing, the pair of freezing-cylinders having removable heads and pulleys at their opposite sides provided with axial trunnions bearing in the slots of the inner frame, one of said trunnions being extended, belts connecting the pulleys, and hoppers located above the cylinders in the outer casing, substantially as specified.

In testimony that I claim the foregoing as my own I have hereto affixed my signature in the presence of two witnesses.

JOHN SIRRINE.

Witnesses:
LEWIS GOODYEAR,
L. J. WHEELER.